(12) United States Patent
Hunt

(10) Patent No.: US 6,260,916 B1
(45) Date of Patent: Jul. 17, 2001

(54) VEHICLE BODY PANEL AND WINDOW SYSTEM

(75) Inventor: Robert M. Hunt, Bingham Farms, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/541,665

(22) Filed: Apr. 3, 2000

(51) Int. Cl.[7] .............................. B62D 33/06; B62D 33/02
(52) U.S. Cl. ................. 296/190.11; 296/183; 296/26.11; 296/146.16; 296/201
(58) Field of Search .............................. 296/183, 190.08, 296/190.11, 26.11, 146.16, 201

(56) References Cited

U.S. PATENT DOCUMENTS

| | | | |
|---|---|---|---|
| 2,602,691 | 7/1952 | Doty ........................................ | 296/66 |
| 3,240,527 | 3/1966 | Weiss et al. ............................. | 296/24 |
| 4,119,341 | * 10/1978 | Cook ................................. | 296/146.16 |
| 4,480,868 | 11/1984 | Koto ..................................... | 296/190 |
| 4,793,099 | * 12/1988 | Friese et al. ................. | 296/146.16 X |
| 4,848,832 | * 7/1989 | Starnes ........................ | 296/190.11 X |
| 4,941,702 | * 7/1990 | Southward .................. | 296/190.11 X |
| 5,934,727 | 8/1999 | Storc et al. ........................ | 296/26.11 |

FOREIGN PATENT DOCUMENTS

| | | | |
|---|---|---|---|
| 358026681 | * 2/1983 | (JP) ................................. | 296/190.11 |
| 358030877 | * 2/1983 | (JP) ................................. | 296/190.11 |

OTHER PUBLICATIONS

U.S. patent application Ser. No. 09/237,337 Adaptive Pick–Up Truck Configuration, filed Jan. 26, 1999.

Chevrolet sees SUV Pickup as Core Product; Automotive News, Jan., 2000 p. 6 Pickup and Go; Automotive News, p. 28, Jan. 3, 2000.

* cited by examiner

*Primary Examiner*—D. Glenn Dayoan
*Assistant Examiner*—Jason Morrow
(74) *Attorney, Agent, or Firm*—Jeffrey A. Sedlar

(57) ABSTRACT

A vehicle body has a first compartment for carrying passengers or cargo and a second cargo compartment rearwardly adjacent the first compartment. The body includes a rear wall optionally separating the first and second compartments with a lower opening between the compartments that allows access therebetween. A closure panel is mounted in the rear wall and is movable between a panel closed position closing the opening and a panel open position allowing access through the lower opening between the compartments. An upper opening in the rear wall above the lower opening is closable by a window mounted in the body and movable to a window open position wherein the window is lowered at least partially into the closure panel, thereby permitting external access to the first compartment through the upper opening. A crossbar extends laterally in the body between the upper and lower openings and contains a window drive mechanism at least partially within the crossbar. The mechanism is operable to slide the window into and out of the upper opening to reach the window closed and open positions and to control external access through the upper opening. Preferably, the window may also be lowered fully into the closure panel and moved with the panel to its open position, thereby allowing access through both upper and lower openings. Optionally, the crossbar may pivot down with the closure panel to open the rear wall fully to access the rear cargo compartment.

17 Claims, 8 Drawing Sheets

VEHICLE BODY PANEL AND WINDOW SYSTEM

TECHNICAL FIELD

This invention relates to vehicles, such as pickup trucks, in which a rear wall of the vehicle passenger compartment is adaptable to provide various configurations for optionally increasing cargo space by extension into the rear passenger area or, alternatively, closing off the cargo area from the passenger compartment.

BACKGROUND OF THE INVENTION

It is known in the art to provide a pickup truck having a cab portion for carrying passengers in a rear seat section behind the driver and a cargo box behind the cab portion for carrying cargo. It is also known to provide aligned openings in the cab portion and the cargo box for carrying longer loads which extend into the passenger compartment with the rear seat folded down. However, a need exists for providing a pickup truck or similar vehicle with a flexible panel and window system that is adapted to accommodate a variety of optional configurations for alternatively carrying a maximum passenger load or an extended cargo load under both covered and uncovered conditions where the cargo load is protected from or exposed to ambient external conditions.

SUMMARY OF THE INVENTION

The present invention provides a vehicle body panel and window system for use in an extended cab pickup truck or other similar vehicle in which the rear wall of the vehicle is adaptable for use in various optional configurations.

In a passenger carrying mode, a rear seat is positioned in a passenger carrying position ahead of a rear wall in which an upper window opening is optionally closed by a movable rear window. A power mechanism is preferably provided for lowering the window down into a portion of the rear wall below the window opening to allow additional cab ventilation or communication with the rear cargo compartment.

Conventionally, the rear seat of the passenger compartment may be folded down to allow carrying of cargo within the passenger compartment on the back of the folded down seat. The vehicle rear wall preferably includes a closure panel that closes an opening below the window. The panel is pivotable inward about a lower pivot axis to fold down over the back of the rear seat and open communication through a lower panel opening in the rear wall between the cargo compartment and the rear portion of the passenger compartment for carrying cargo extending between the two compartments.

A crossbar preferably extends transversely across the rear wall between the upper window opening and the lower panel opening. At least partially within the crossbar is a window drive mechanism that is preferably power-operated by a motor within the crossbar, or external thereto. The window drive mechanism operates to hold the window up whether the closure panel below the crossbar is in the open or closed position. Alternatively, the window may be lowered partially into the panel and partially in the crossbar and the crossbar can be arranged to pivot with the panel to the open position. In this configuration, the upper window opening, the lower panel opening and the space between where the crossbar normally extends are all connected to form one large opening that communicates with the rear cargo compartment.

In another alternative, the window drive mechanism includes drive means mounted on or adjacent to the panel as well as on the crossbar and the window may be lowered thereby through the crossbar completely into the panel, after which the panel may be tilted forward to communicate the rear passenger compartment with the cargo compartment through both the lower panel opening and the upper window opening with the crossbar remaining in place between them.

In a preferred embodiment, the invention provides power operation of the window between closed, partially open and fully open positions. In the latter, the window resides completely within the panel and is folded down therewith, communicating the rear passenger compartment with the cargo compartment through both the lower and upper openings. Alternatively, the window may be raised and the panel opened to connect the compartments through the lower opening only. In this option, the cargo compartment may be covered by a removable cover which engages the rear wall at the crossbar or at the window itself to limit the potential of entry of ambient substances, such as water or dust, into the passenger compartment area when cargo is being carried which extends into both of the compartments.

In all the optional embodiments, power operation of the window between open and closed positions is provided, so that only repositioning of the passenger rear seat and the panel and/or panel and crossbar require manual operation, thus simplifying the manual steps required to change the body structure from one optional configuration to another.

These and other features and advantages of the invention will be more fully understood from the following description of certain specific embodiments of the invention taken together with the accompanying drawings.

DESCRIPTION OF THE PREFERRED EMBODIMENT

Figure 1:
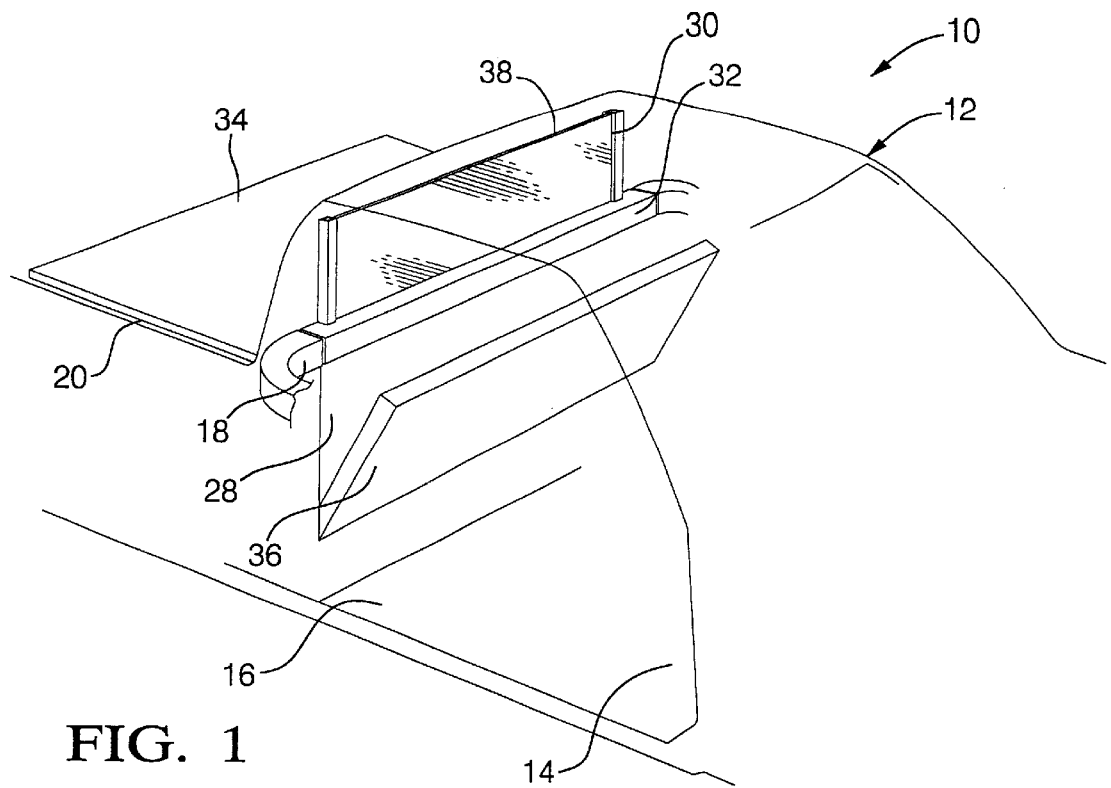
FIG. 1 is a fragmentary pictorial view partially in phantom illustrating a preferred embodiment of vehicle body panel and window system according to the invention.

Referring first to FIGS. 1–5 of the drawings, numeral 10 generally indicates a pickup truck of the extended cab type having a body 12 including an internal front compartment 14 connected with an internal rear compartment 16 which is separated by a rear wall 18 from an external rear cargo compartment or cargo box 20. As shown in FIGS. 2–5, the front compartment includes at least one passenger seat 22 for carrying the driver and one or more passengers. The rear compartment 16 also includes a seat including a lower cushion 24 and a back cushion 26.

As best shown in FIG. 1, the rear wall 18 includes a lower opening 28 and an upper opening 30 separated by a laterally extending crossbar 32. The rear cargo compartment or cargo box 20 is optionally closed by a removable cover 34.

Figure 3:
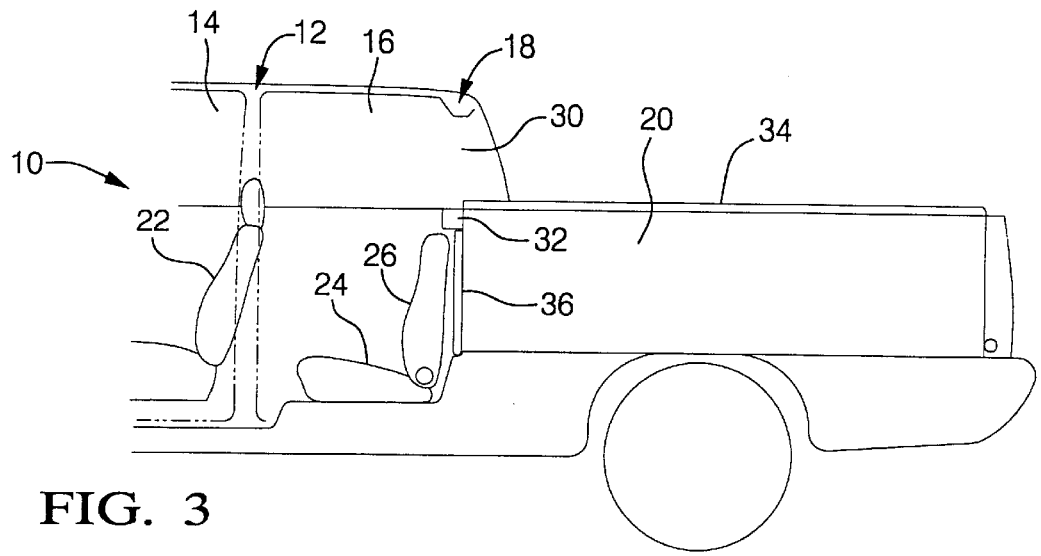
FIG. 3 is a view similar to FIG. 2 but showing an open rear window configuration.
Figure 4:
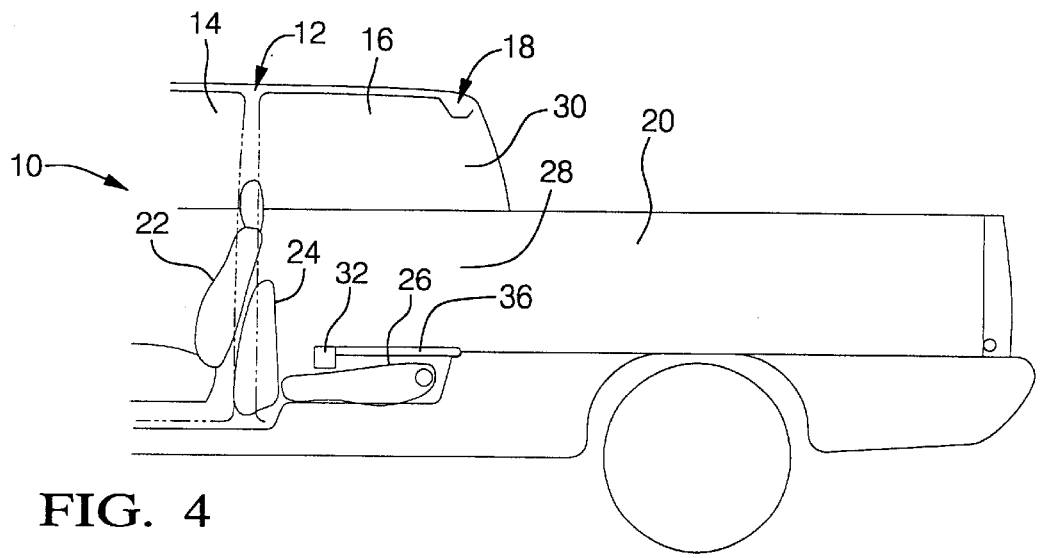
FIG. 4 is a view similar to FIG. 2 but showing a configuration with fully open access to the rear cargo compartment.
Figure 5:
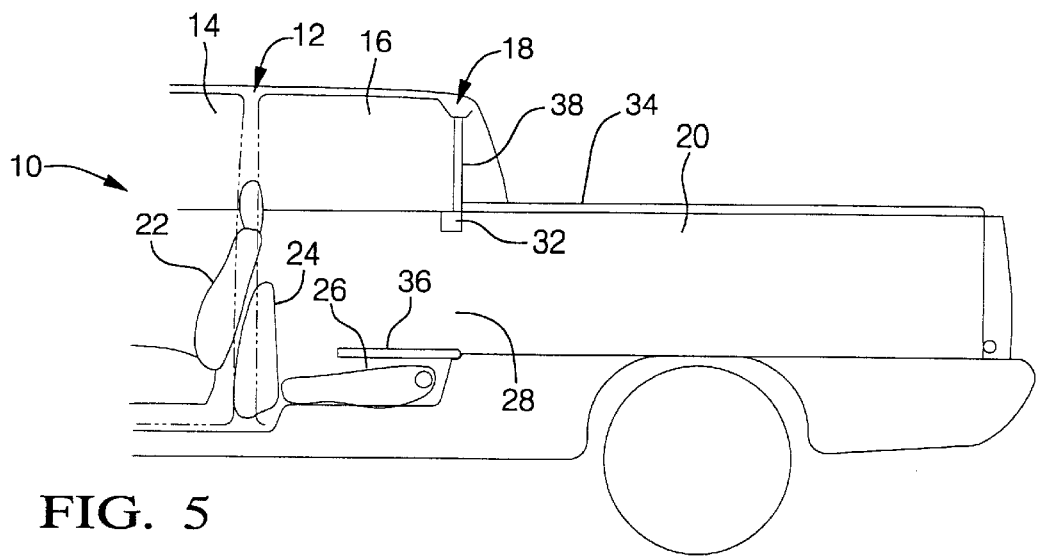
FIG. 5 is a view similar to FIG. 2 but showing covered access through a lower opening joining the cargo and rear passenger compartments in a cargo carrying configuration.

The lower opening 28 communicates the passenger rear compartment 16 with the interior of the cargo compartment 20. Opening 28 is normally closed by a closure panel 36 which is pivotally mounted on the body adjacent its lower end and is movable between a closed position, as shown in FIGS. 2 and 3, wherein the panel closes the lower opening 28, and an open position, as shown in FIGS. 4 and 5 wherein the panel pivots forward and opens communication between the cargo compartment 20 and the rear passenger compartment 16.

The upper opening 30 is normally closed by a backlight or rear window 38 which is supported by a window drive mechanism, to be subsequently described, that is mounted in part within the crossbar 32. The various features of the rear wall 18, as well as the rear seat cushions 24, 26 and the cargo box cover 34 are movable into various positions, to be subsequently described, in order to reconfigure the truck body 12 for various modes of use.

FIG. 1, for example, omits the interior seats but shows the rear window 38 raised to close the upper opening 30 and held in place by the mechanism, not shown, within the crossbar 32 while the closure panel 36 is being pivoted forward toward a horizontal position to open communication through lower opening 28 between the cargo compartment 20 and the rear compartment 16.

Figure 2:
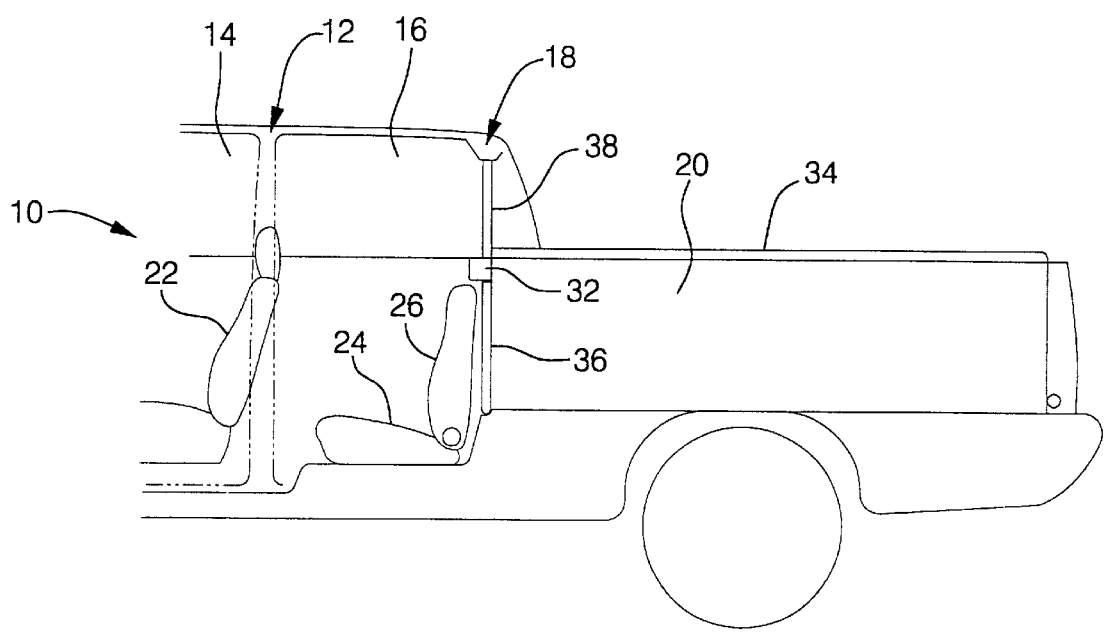
FIG. 2 is a partial side view of the body of the invention with the components in a closed passenger compartment configuration.

Referring next to FIG. 2, the truck body 12 is shown in a conventional position for maximum passenger accommodation wherein the rear seat cushions 24, 26 are positioned to carry passengers. The closure panel 36 is in its closed position separating the interior of the cargo compartment from the rear passenger compartment 16 and the rear window 38 is raised to close the upper opening and protect the passenger rear compartment 16 against the entry of ambient air or water from the exterior of the vehicle. The cargo cover 34 is also in place to enclose the cargo compartment and protect materials which may be carried there from direct exposure to exterior ambient conditions.

As will be subsequently further explained, the window drive mechanism 40 is operable to control the position of the rear window 38. Mechanism 40 may be contained partially within the crossbar 32 and optionally partially in or on the closure panel 36 or adjacent portions of the rear wall 18. When desired, the window 38 is held by the mechanism in the upper closed position shown in FIGS. 1, 2 and 6. Optionally, the window may be lowered fully into the closure panel 36. Alternatively, the window may be lowered so that it is partially within the crossbar 32 with the remainder in the closure panel 36.

When the window 38 is fully lowered, the closure panel 36 may be tilted forward with the window inside to open communication through the lower opening 28. Alternatively, if desired, when the window is lowered within the crossbar 32 and closure panel 36, the crossbar and panel may be pivoted forward together with the window inside to open communication through both upper and lower openings and the space between them normally occupied by the crossbar. Suitable latches, not shown, may be provided to separately retain the crossbar 32 and the panel 36 in their upper closed positions when desired.

FIG. 3 illustrates one of the optional configurations wherein the rear window 38 is lowered to open communication through the upper opening 30 between the passenger rear compartment 16 and external ambient air. The cargo cover 34 is shown in place bearing against the rear wall and/or the crossbar 32 to maintain protection of cargo in the cargo compartment against exposure to the elements. If desired, the cargo cover 34 may be removed to open the cargo compartment while the rear window remains open, as shown, or is closed, as shown in FIG. 2.

FIG. 4 illustrates another optional configuration, wherein the rear seat cushions are first reconfigured with the lower cushion 24 tilted forward and the back cushion 26 tilted forward and downward to form a floor for storing cargo within the rear passenger compartment. This may be accomplished with the closure panel 36 upright and the rear window raised, as shown in FIG. 2, so that the rear passenger compartment becomes a second cargo compartment completely closed in the body. However, FIG. 4 illustrates an alternative wherein the rear window is lowered into the crossbar 32 and closure panel 36 and the two are pivoted downward and forward to lie against the upper surface of the back cushion, forming a floor for cargo which may extend from the rear cargo compartment 20 into the rear passenger compartment 16. In this alternative with the cargo cover 34 removed as shown, the passenger rear compartment 16 and the adjoining cargo compartment 20 are open to ambient conditions but are configured to receive a maximum amount of cargo which may extend into the rear passenger compartment, now configured for cargo, as well as into the cargo compartment.

Another alternative configuration is illustrated in FIG. 5 wherein the closure panel 34 is tilted forward to form a floor within the passenger rear compartment 16 but the crossbar 32 remains in place across the rear wall and the rear window 38 has been raised to its closed position in which it is held by the mechanism within the crossbar 32. The cargo cover 34 is also shown in place. In this configuration then, cargo may be carried which extends from the cargo compartment 20 into the rear compartment 16 but the entire cargo storage area is enclosed by the cargo cover and the rear window 38 so that substantial protection from the elements is provided to the interior of the vehicle body as well as to the cargo compartment itself.

The various configurations shown are merely illustrative of the optional configurations which may be formed by the various movable features of the truck body so far described and as may be made possible by the features of the present invention. In the following portion of the description, a number of optional drive mechanisms formed in accordance with the invention are described, as are other features for providing the various optional configurations obtainable in a truck body in accordance with the invention.

Figure 6:
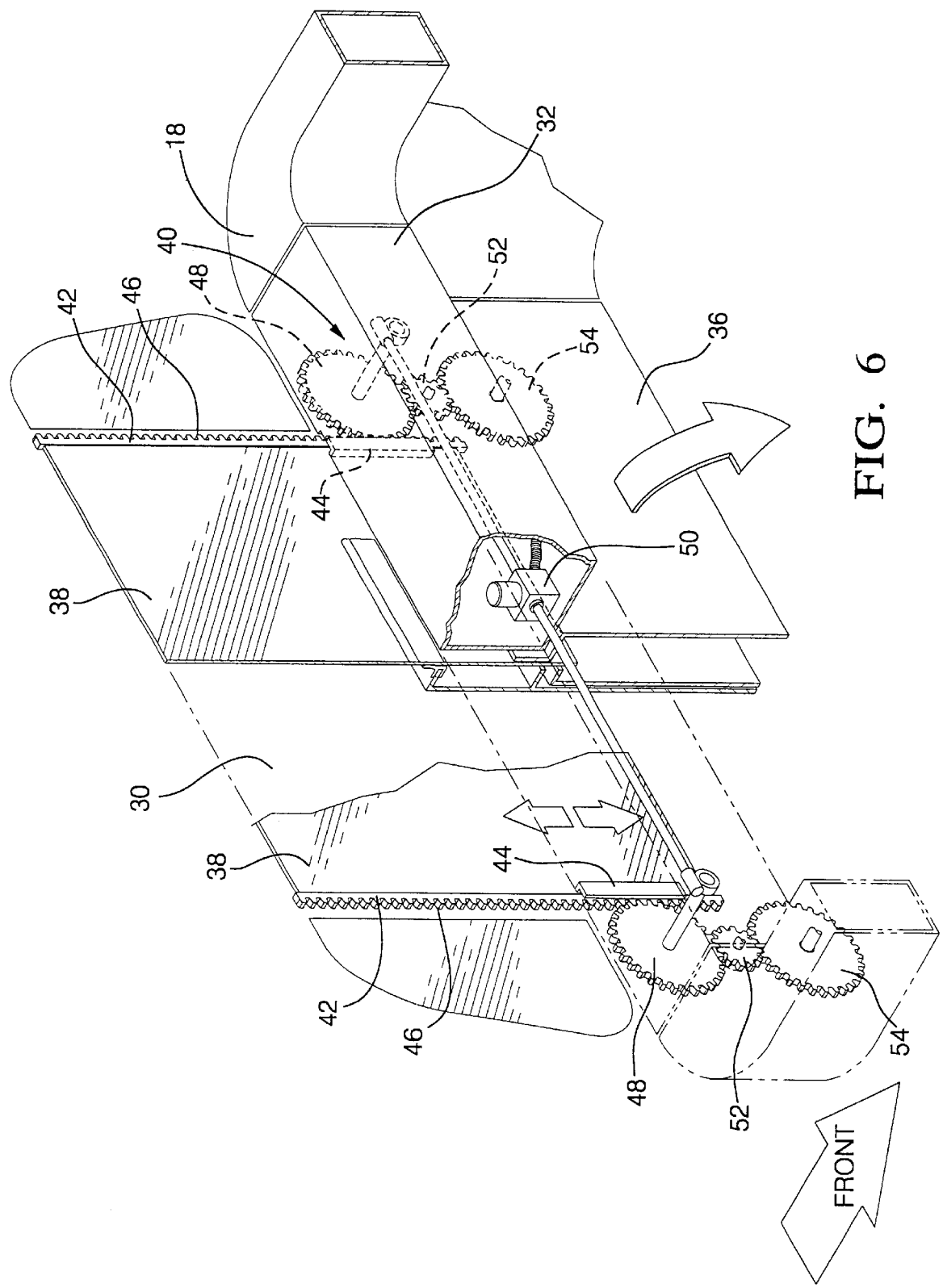
FIG. 6 is a pictorial view illustrating a first embodiment of window drive mechanism in accordance with the invention.

FIG. 6 shows a first embodiment of window drive mechanism 40 according to the invention mounted within portions of the rear wall 18, previously described. Drive mechanism 40 includes driven elements in the form of vertically extending racks 42 that encapsulate or are otherwise fixed to the sides of the rear window 38. The racks 42 are positioned by internal guides 44 mounted within the crossbar 32. Similar guides may be mounted within the closure panel 36 and in the rear wall outwardly adjacent the upper opening 30 which may be closed by the rear window.

The racks include outwardly facing teeth 46 which are engaged by mating teeth of a pair of spur drive gears 48 disposed in the plane of the window on opposite sides thereof Gears 48 are rotatably mounted within the crossbar 32 and are connected by suitable drive means to a power actuator in the form of a drive motor 50 mounted centrally of the crossbar between the two gears 48 and forward of the window 38. The gears 48 are rotatable by the drive motor 50 to raise the window 38 into its upper closed position or to lower the window downwardly out of opening 30 and into the crossbar 32 with a lower portion extending into the pivotable closure panel 36.

In order to fully lower the window into the closure panel, additional mechanism is required which is provided in the form of idler gears 52 mounted in the panel 36 and connected between the drive gears 48 and a second pair of drive gears 54, also mounted in the panel 36. Drive gears 54 engage the teeth of racks 42 when the window is in a lower position extending into the panel 36, as is further explained by reference to FIGS. 7–9.

Figure 7:
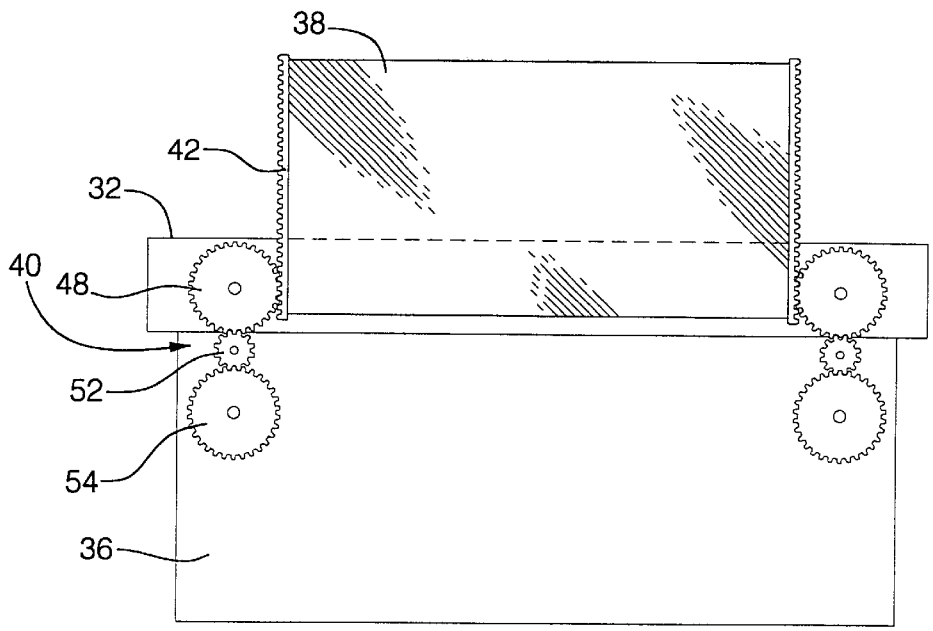
FIG. 7 is a partially schematic view illustrating the system of FIGS. 1 and 6 with the window glass raised to the closed position.
Figure 8:
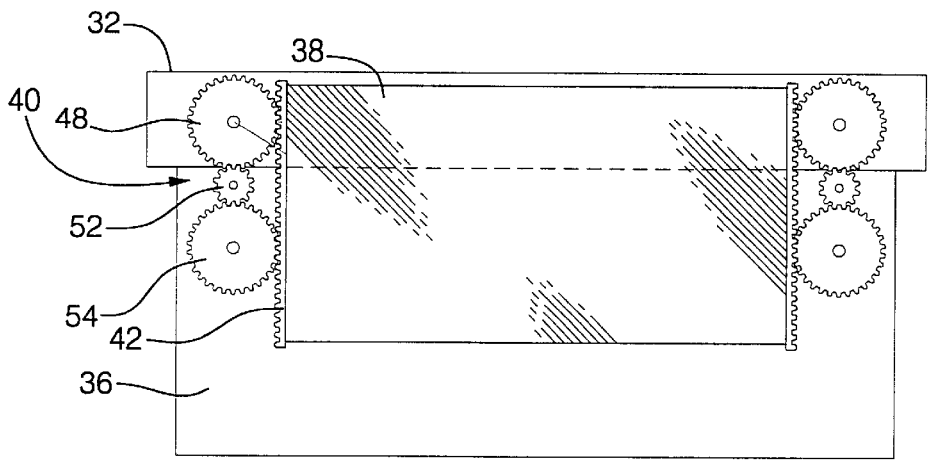
FIG. 8 is a view similar to FIG. 7 showing the glass lowered to a partially opened condition even with the top of the crossbar.

FIG. 7 illustrates a mechanism 40 holding the window 38 in its upper position where it is held in place by the upper drive gears 48 which are located within the crossbar 32. As the window is lowered into its partially open position shown in FIG. 8, the racks also engage the lower drive gears 54 which act with the upper gears 48 to lower the window so that the glass is positioned within the crossbar and the panel. In this position, the panel and the crossbar may be tilted forward with the glass inside so as to open the entire rear wall of the vehicle passenger compartment for the entry of cargo therein.

Figure 9:
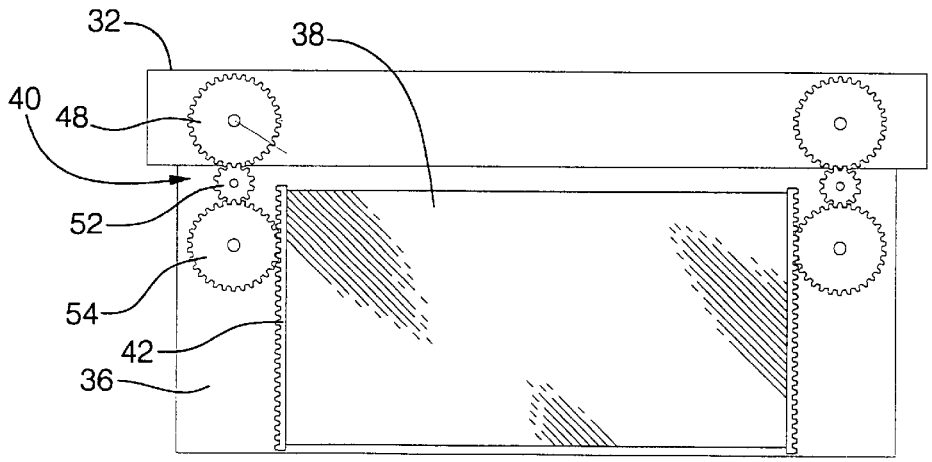
FIG. 9 is a view similar to FIGS. 7 and 8 with the glass lowered completely into the panel in a fully opened condition.

However, if it is desired only to open the lower and upper openings 28, 30 while leaving the crossbar 32 in place, the mechanism 40 is operable to further lower the window 38 so that it is contained wholly within the panel 36, as shown in FIG. 9. As the window is lowered, the racks 42 are disconnected from the upper drive gears 48 and are driven solely by the lower drive gears 54 which, with the idler gears 52, are mounted on the closure panel 36. Thereafter, when the panel 36 is pivoted forward, the idler gears 52 are disconnected from the upper drive gears 48 and move with the panel into the horizontal position. Subsequently, when the panel is again raised to its vertical position, closing the lower opening 28, the idler gears 52 reengage with the upper drive gears 48 so that the drive mechanism is again reconnected and may be operated to again raise the window into its upper closed position. During the lowered position of the panel, the upper drive gears are maintained in place by their connections to the stationary drive motor 50 while the lower drive gears are maintained in place by the window 38 retained within the panel 36. If desired, lock means, not shown, may be provided to positively lock the lower drive gears and the window 38 in position within the panel when it is disconnected from the upper drive gears 48.

Figure 10:
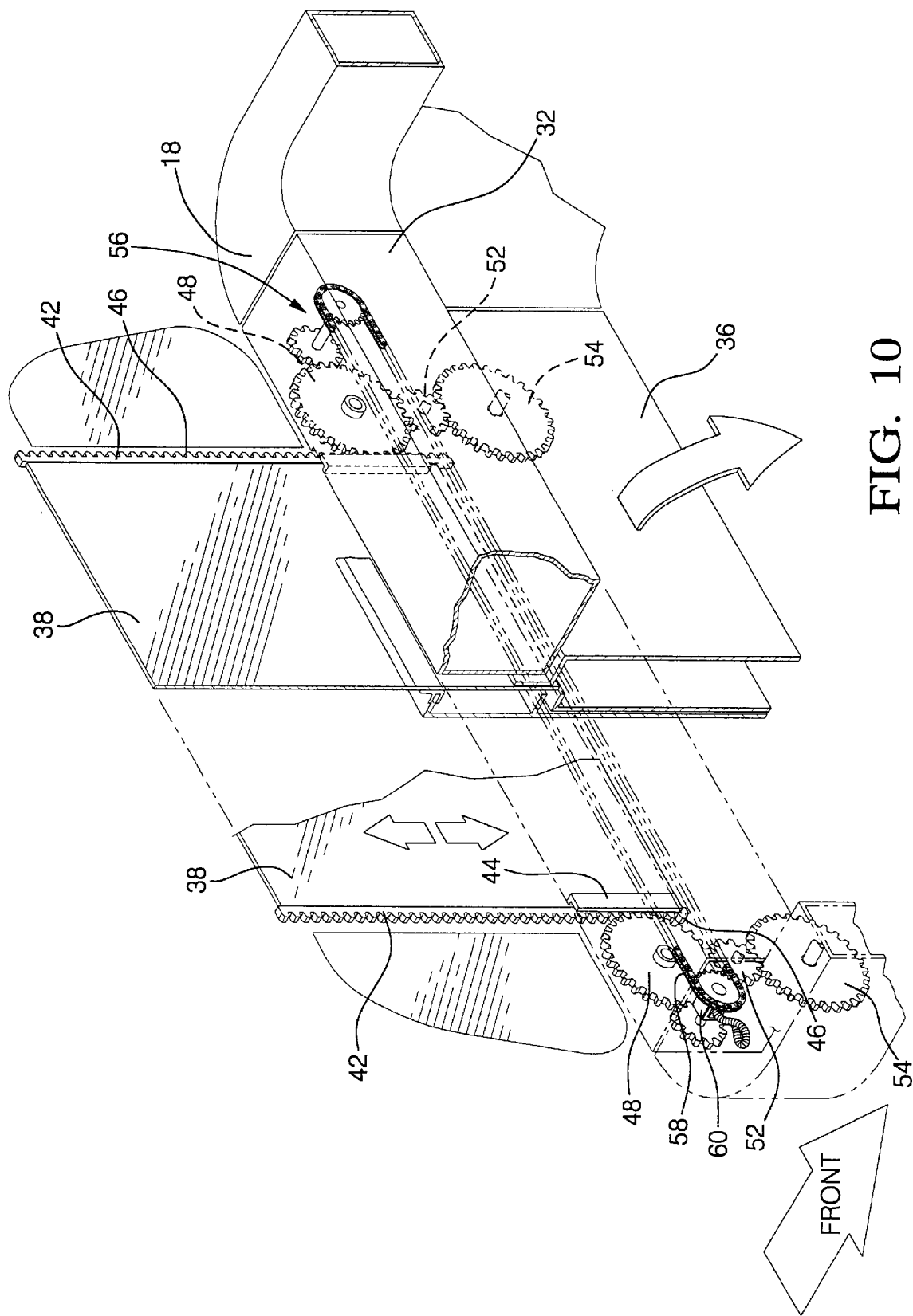
FIG. 10 is a pictorial view illustrating a second embodiment of window drive mechanism in accordance with the invention.

Referring now to FIG. 10, there is shown an alternative window drive mechanism 56 which is similar in general configuration to the embodiment of FIG. 6 and wherein like numerals indicated like parts. Mechanism 56 differs from mechanism 40 of FIG. 6 in that the upper drive gears 48 are connected by a chain 58 mounted within the crossbar and acting through associated sprockets and shafts instead of by the drive shafts of FIG. 6. Also, a drive motor 60 is mounted at one end of the cross bar between one of the sprockets and a pinion drive gear which act to maintain the upper drive gears 48 in synchronism. In other ways, the mechanisms of FIGS. 10 and 6 are essentially the same.

Figure 11:
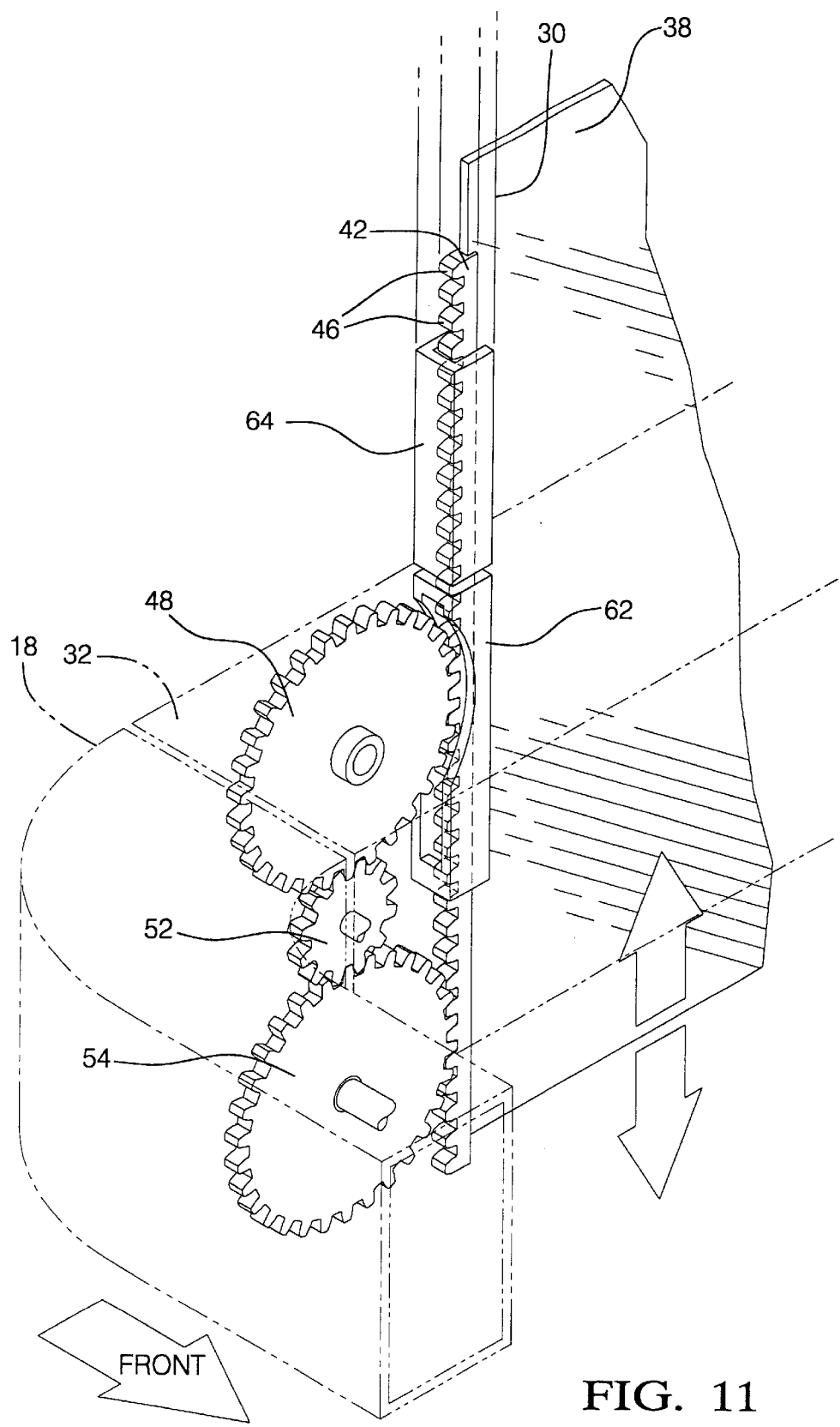
FIG. 11 is a pictorial view illustrating a modification of the mechanism embodiments of FIGS. 6 and 10.

FIG. 11 illustrates a modification of the prior disclosed embodiments wherein guide channels 62, 64 are positioned within the crossbar 32 and beside the upper opening 30 in the rear wall in order to guide the window 38 in its motion. A similar channel, not shown, could also be located within the closure panel 36.

Figure 12:
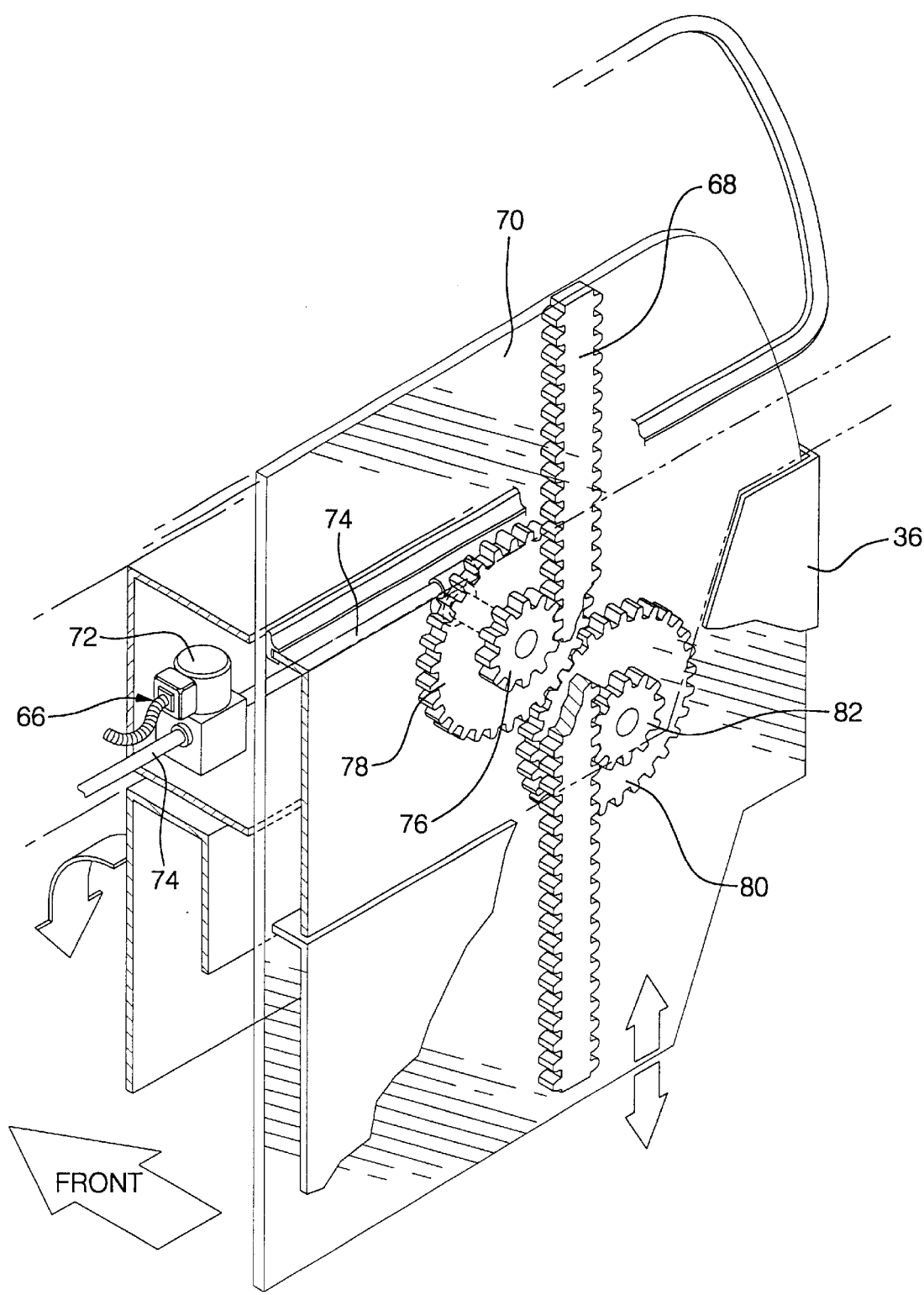
FIG. 12 is a fragmentary pictorial view illustrating still another embodiment of window drive mechanism according to the invention.

Referring now to FIG. 12, a somewhat different form of window drive mechanism 66 is illustrated. In this embodiment, double toothed racks 68 are applied on the inner face of the backlight or window 70 inwardly adjacent either side of the window, only the right half of which is shown in the figure. A drive motor 72 connects through shafts 74 with an upper drive gear 76. Gear 76 engages inner teeth of rack 68. It is also attached to and rotates with a large idler gear 78 that is diagonally connected with a lower idler gear 80. The latter connects with a lower drive gear 82 which engages outer teeth of rack 78 to cooperate with the upper drive gear 76 and drive the window between its upper and lower positions. The lower drive and idler gears 82, 80 are mounted on a common shaft supported in the closure panel 36 while the upper drive gear and idler gear 76, 78 are mounted on a shaft supported within the crossbar 32.

When the panel 36 is lowered without the crossbar 32, with the window in either the full up or full down positions, idler gear 80 is pivoted out of engagement with idler gear 78. Gear 80 moves with the panel to its horizontal position while the idler gear 78 and drive gear 76 remain in place through their connection with the drive motor 72. If the window 70 is in the upper position, the drive motor and drive gear 76 maintain the window in that position while the panel 36 is pivoted into either its open or closed positions.

Figure 13:
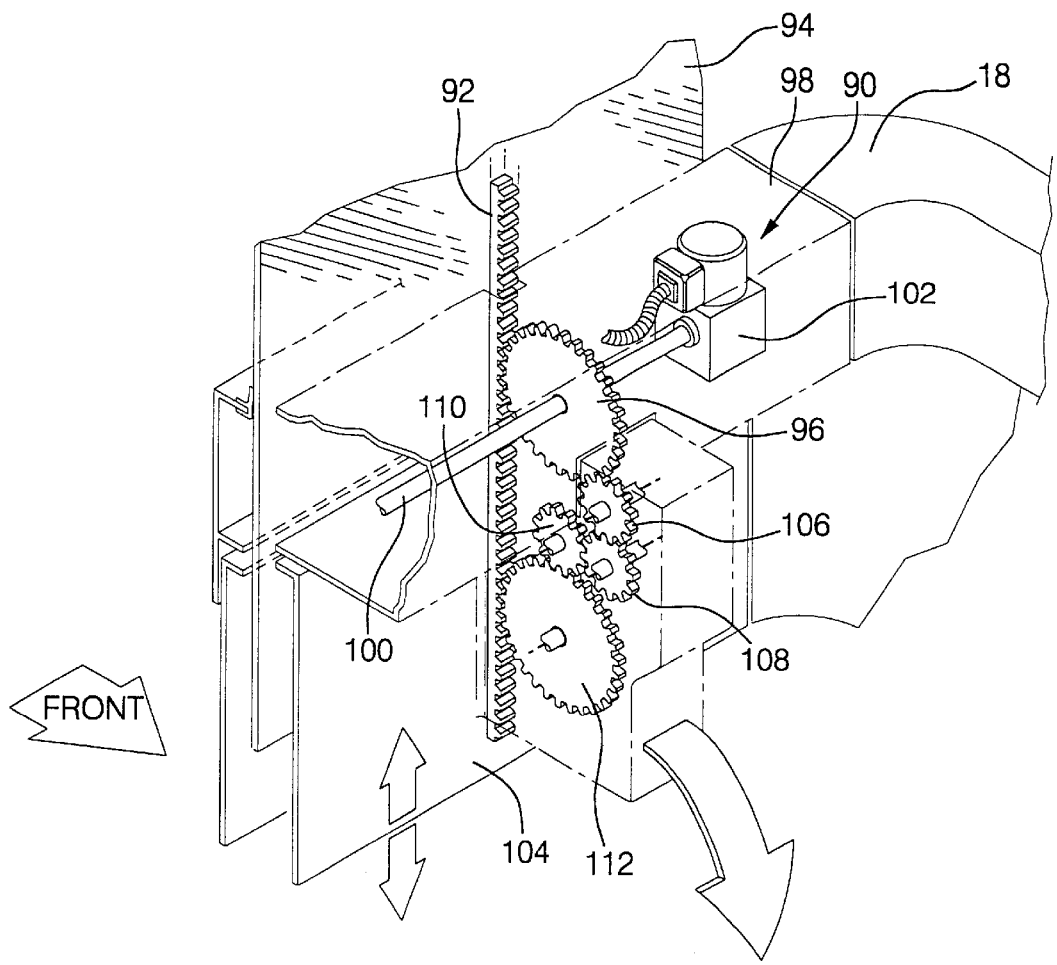
FIG. 13 is a pictorial view illustrating yet another embodiment of window drive mechanism according to the invention.

Referring now to FIG. 13, there is shown a somewhat different though operationally similar window drive mechanism, generally indicated by numeral 90. In mechanism 90, a rack 92 is fixed to the front face adjacent each side of a window 94 and is engaged by a drive gear 96 carried within a crossbar 98. The drive gear 96 is rotatable in a plane normal to that of the window and on a shaft 100 connected with and driven by a motor 102 mounted within the crossbar 98. A second drive gear 96 is also mounted on shaft 100 and engages a second rack 92 fixed to the forward side of the window adjacent the left edge thereof, although not shown in the drawing.

Figure 14:
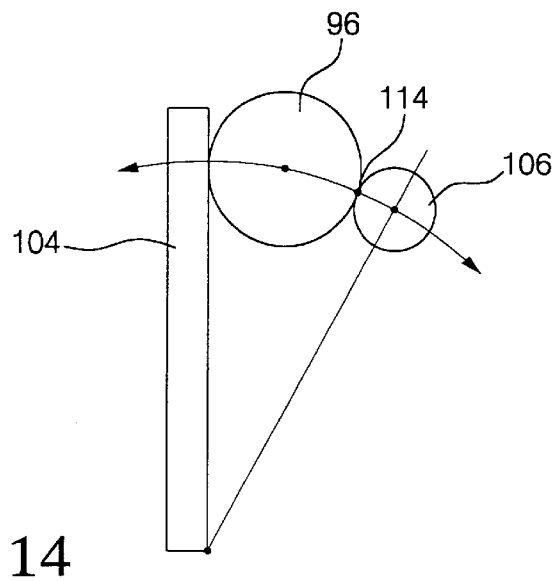
FIG. 14 is a schematic view illustrating the relationship of the disengageable drive and driven gears in the embodiment of FIG. 13.

Drive gears 96 carried within the crossbar 98 are engageable with the additional gears mounted on or within a closure panel 104 when the panel is in the closed position. In this position, gears 96 engage idler gears 106 which, in turn, connect through idlers 108, 110 with lower drive gears 112, all of which are carried by the closure panel 104. When the closure panel 104 is closed, gears 106 and 96 are in engagement, as shown in FIGS. 13 and 14, so that the window 94 may be moved between its upper and lower positions by engagement of the drive gears 96, 112 with the rack 92. When the window is in either the full up or full down positions, the closure panel 104 may be tilted downward carrying the idler and lower drive gears with it so that idler gears 106 are disconnected from their associated drive gears 96 at the point of engagement 114 illustrated in FIG. 14. Since the panel carried gears are all pivoted with the panel about the lower pivot axis of the panel, the engagement and disengagement of the idler gears from the upper drive gears is located on the arcuate path of connection between the two gears and thus permits reengagement of the gears without requiring any rotation of either gear to obtain reengagement in the position occupied by the gears prior to disengagement.

With the embodiment of FIGS. 13 and 14, as with the previous embodiments, the window may also be partially lowered and the crossbar 98 may be pivoted with the window in place within the crossbar and panel. In this case, the complete drive mechanism will be maintained in engagement without separation caused by the pivoting motion of the closure panel.

If it is desired to provide only this option without allowing the option of opening of the closure panel without moving the crossbar, the lower drive gears and idler gears may be eliminated and the window may be operated solely through the upper drive gears driven by the drive motor within the crossbar. In this case, the window drive mechanism is greatly simplified and is always engaged with the window whether it is in the raised or lowered position. However, if this option is utilized, the window cannot be lowered into the panel and pivoted downward without also pivoting the crossbar with it since the window must be connected with the drive mechanism at all times.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A vehicle body having a first compartment for carrying passengers or cargo and a second compartment rearwardly adjacent the first compartment, the body including a rear wall optionally separating the first and second compartments, said rear wall including:
    a lower opening between the first and second compartments and allowing access therebetween;
    a closure panel mounted in the rear wall and movable between a panel closed position closing the opening and a panel open position permitting access through the lower opening between the first and second compartments;
    an upper opening above the lower opening;
    a window mounted in the body and movable between a window closed position closing the upper opening and a window open position wherein the window extends at least partially into the closure panel, thereby permitting external access to the first compartment through the upper opening;
    a crossbar extending laterally in the body between the upper and lower openings; and
    a window drive mechanism at least partially within the crossbar and operable to slide the window into and out of the upper opening to reach the window closed and open positions and control said external access through the upper opening.

2. The invention as in claim 1 including a drive motor connected with the window drive mechanism for power actuation of the window opening and closing motions.

3. The invention as in claim 1 wherein said closure panel is mounted adjacent a lower edge for pivotal movement between its closed and open positions.

4. The invention as in claim 1 wherein said panel lies generally horizontal in its open position and forms a floor for carrying cargo thereon.

5. The invention as in claim 3 wherein said mechanism is selectively operable to store the window within the crossbar and the panel in the window open position, and the panel and crossbar are pivotably movable together with the stored window to the panel open position to provide full access through the rear wall between the first and second compartments.

6. The invention as in claim 3 wherein said mechanism is mounted in part on the panel and is selectively operable to store the window completely within the panel in the window open position, and the panel with the stored window is movable to the panel open position while the crossbar remains in place in the body between the upper and lower openings, thereby allowing access through the upper and lower openings to the first and second compartments.

7. The invention as in claim 3 wherein said mechanism is operative to maintain the window in the window closed position while the panel is moved to the panel open position, thereby allowing access between the first and second compartments only through the lower opening.

8. The invention as in claim 7 wherein said second compartment has an open top and the body includes a cargo cover optionally positionable to close said open top and limit the entry of ambient substances to the first compartment through the second compartment.

9. The invention as in claim 3 wherein said first compartment includes a seat with a back foldable between a seating position adjacent the rear wall and a cargo position forming a floor for supporting cargo and allowing movement of the panel to said panel open position wherein the panel forms an extension of the floor between the first and second compartments for receiving cargo extending between the compartments.

10. A vehicle body having a first compartment for carrying passengers or cargo and a second compartment rearwardly adjacent the first compartment, the body including a rear wall optionally separating the first and second compartments, said rear wall including:
    a lower opening between the first and second compartments and allowing access therebetween;
    a closure panel mounted in the rear wall and movable between a panel closed position closing the opening and a panel open position permitting access through the lower opening between the first and second compartments;
    an upper opening above the lower opening;
    a window mounted in the body and movable between a window closed position closing the upper opening and a window open position wherein the window extends at least partially into the closure panel, thereby permitting external access to the first compartment through the upper opening;
    a crossbar extending laterally in the body between the upper and lower openings; and a window drive mechanism in the crossbar and operable to slide the window into and out of the upper opening to reach the window closed and open positions and control said external access through the upper opening;

said mechanism including synchronized drive members positively engaging driven elements fixed to laterally spaced portions of the window, and an actuator for actuating the drive members to move the window between the closed and open positions, the mechanism maintaining the window in a selected closed position until the actuator is actuated in a window opening direction.

11. The invention as in claim 10 wherein said drive members include a first pair of toothed gears engaging linearly spaced teeth of the driven elements when the window is in the closed position or an open position within the crossbar and the closure panel, the driven elements lying above the closure panel when the window is closed so that the closure panel may be opened and lying below the upper opening when the window is closed so that the crossbar and the closure panel may be opened together with the window inside them.

12. The invention as in claim 10 wherein said drive members include a second pair of toothed gears pivotable with the closure panel and engaging the teeth of the driven elements when the window is lowered below the upper opening, said pairs being interconnected for moving the window and the driven elements fully into the closure panel whereby the closure panel may be opened with the window inside, without moving the crossbar, to open both upper and lower openings, and the closure panel may be opened with the window closed to block the upper opening while opening the lower opening.

13. The invention of claim 10 wherein said actuator is a drive motor.

14. The invention as in claim 13 wherein the drive motor is in the crossbar.

15. The invention as in claim 10 wherein the drive members and the driven elements are aligned substantially with adjacent edges of the window.

16. The invention as in claim 10 wherein the drive members and the driven elements are aligned in a plane substantially parallel with the window.

17. The invention as in claim 10 wherein the drive members and the driven elements are aligned in a plane lying at a substantial angle with the window.

* * * * *